United States Patent [19]

Satzler

[11] Patent Number: 4,650,260

[45] Date of Patent: Mar. 17, 1987

[54] VARIABLE LEVERAGE RECOIL MECHANISM

[75] Inventor: Ronald L. Satzler, Princeville, Ill.

[73] Assignee: Caterpillar Inc., Peoria, Ill.

[21] Appl. No.: 858,789

[22] Filed: May 2, 1986

[51] Int. Cl.$^4$ .................. B62D 55/10; B62D 55/30
[52] U.S. Cl. .................................... 305/31; 305/32
[58] Field of Search .................. 305/10, 22, 31, 32

[56] References Cited

U.S. PATENT DOCUMENTS

| 2,017,729 | 10/1935 | Panzegrau et al. | 74/242.15 |
| 2,326,486 | 8/1943 | Norelius | 305/31 |
| 2,719,062 | 9/1955 | Arps | 305/31 X |
| 3,343,889 | 9/1967 | Bexten | 305/10 |
| 3,899,218 | 8/1975 | Blomstrom | 305/31 |

FOREIGN PATENT DOCUMENTS

| 1108575 | 6/1961 | Fed. Rep. of Germany | 305/32 |
| 1158379 | 11/1963 | Fed. Rep. of Germany | 305/10 |

OTHER PUBLICATIONS

Service Manual on Allis-Chalmers H.D. 21 Tractor, dated Jun. 1959, pp. 352-353.

Primary Examiner—David A. Scherbel
Attorney, Agent, or Firm—John W. Grant

[57] ABSTRACT

Recoil spring mechanisms are useful, for example, in relieving excessive tension in the track of track-type vehicles. Because the idler wheels recoil in a one-to-one relationship against a recoil spring, the tension in the track still increases drastically from when recoil first starts to full recoil. The subject variable leverage recoil mechanism has the idler wheel mounting bracket and first and second links arranged such that equal increments of movement of the idler wheel from a normal operating position toward a recoiled position results in progressively decreasing increments of compression of the recoil spring. This results in the idler wheel having a progressively increasing mechanical advantage over the recoil spring when the idler wheel move toward a recoiled position.

11 Claims, 5 Drawing Figures

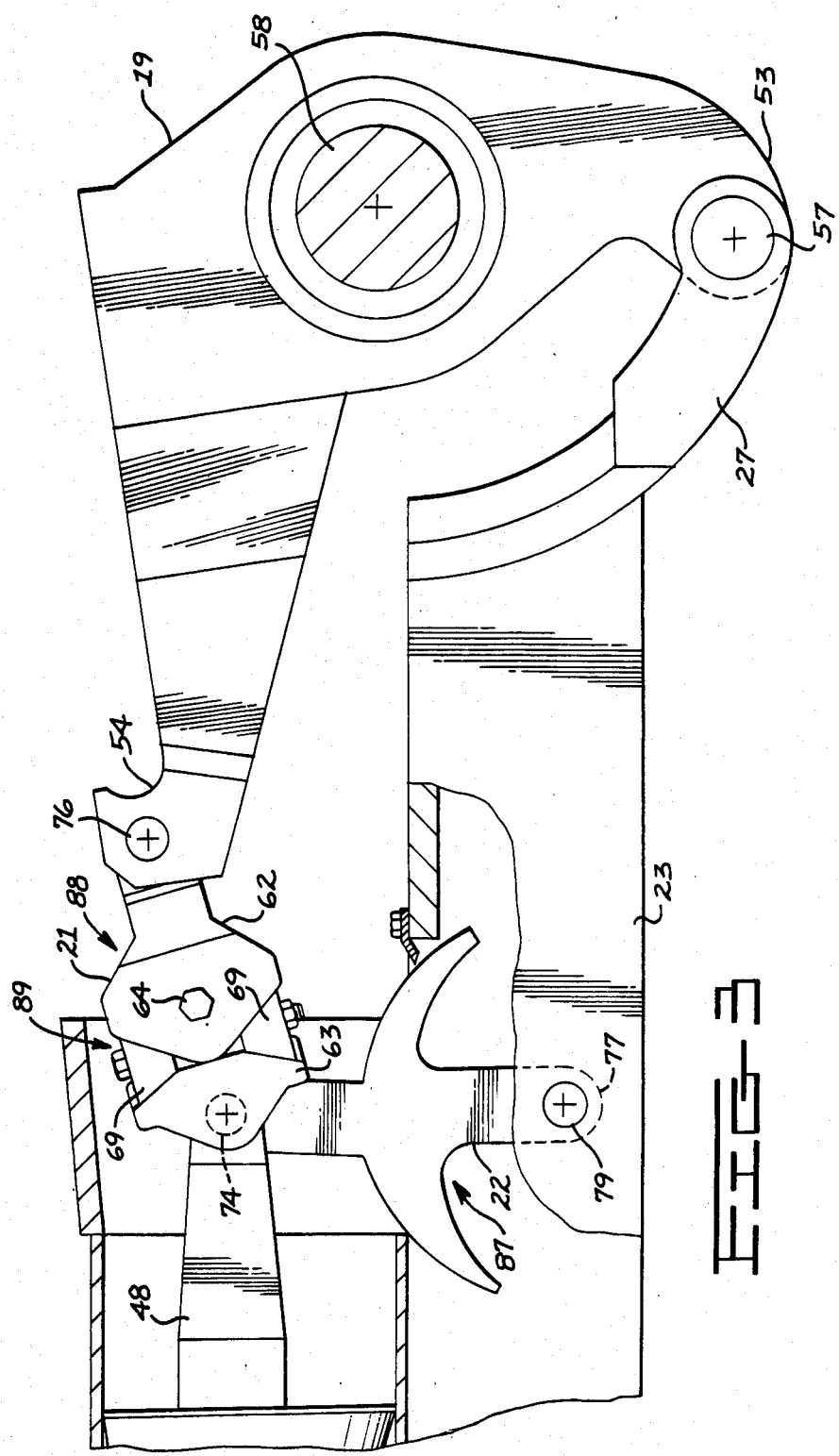

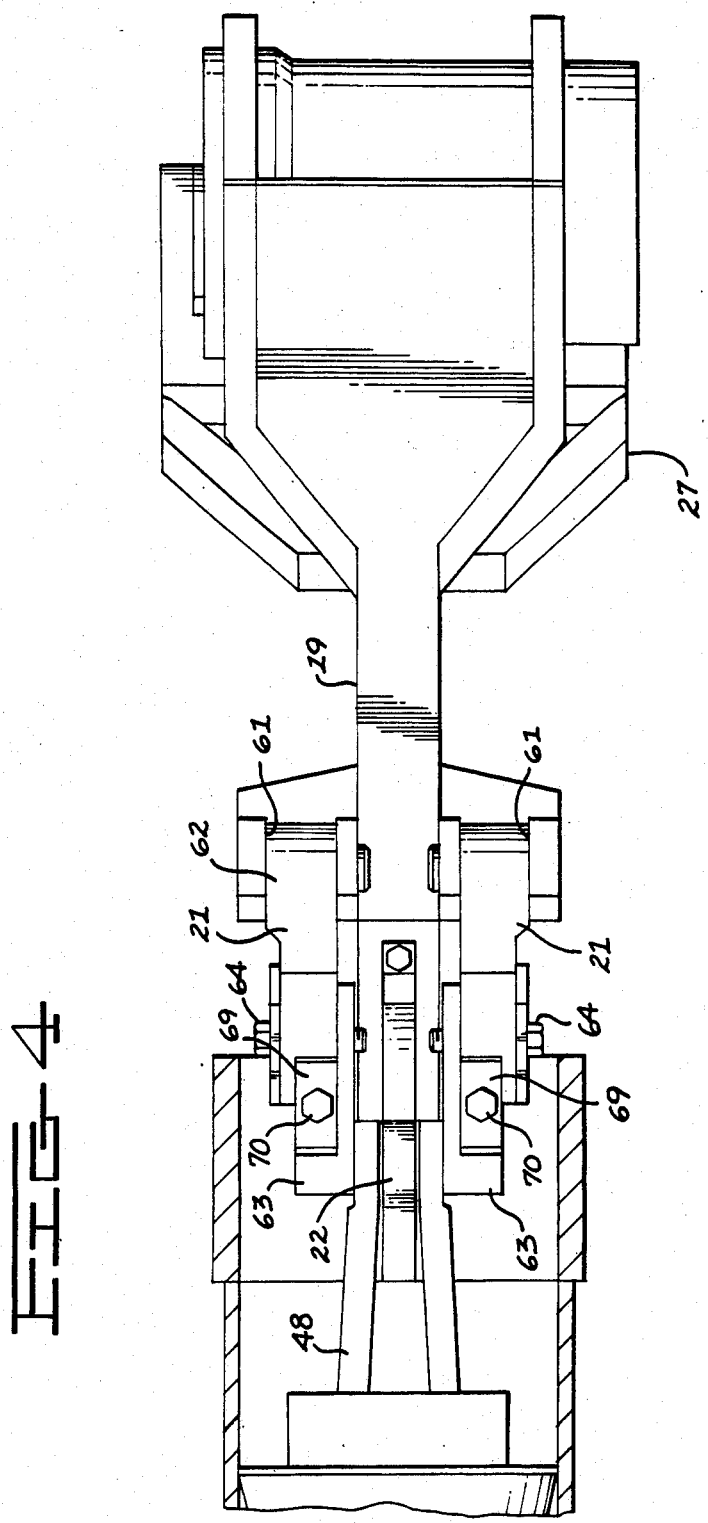

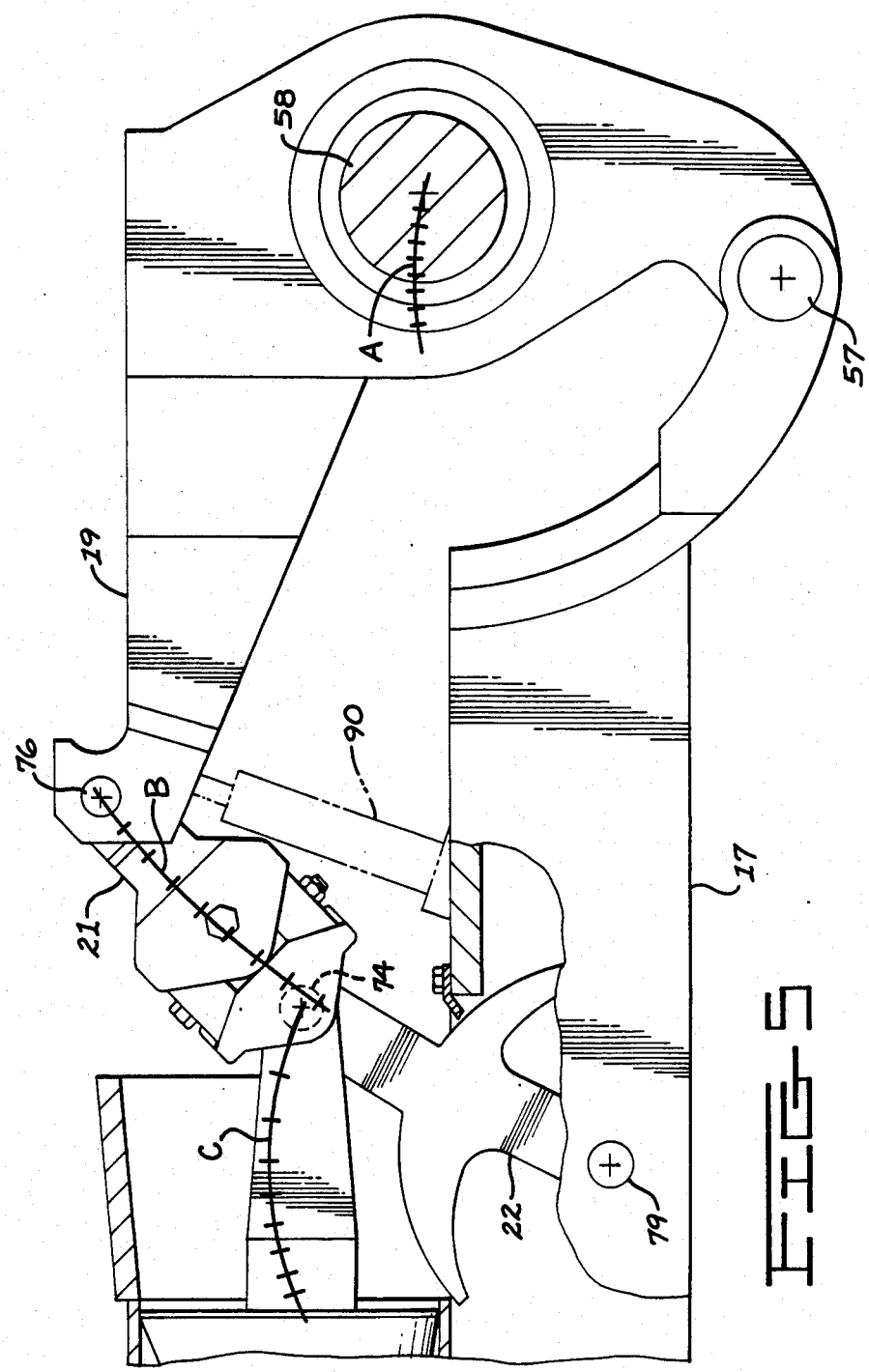

VARIABLE LEVERAGE RECOIL MECHANISM

TECHNICAL FIELD

This invention relates generally to recoil mechanisms and more particularly to a variable leverage recoil mechanism for preventing the tension in a track belt from increasing excessively during recoil.

BACKGROUND ART

Track type vehicles commonly use a recoil mechanism to relieve excessive stresses in the track system when foreign material is ingested between the track and the idler and/or drive wheels. Most of such recoil mechanisms use a stiff recoil spring which resiliently resists movement of the idler wheel toward the drive wheel but which will permit such movement of the idler wheel if the force acting on the idler wheel is sufficient to overcome the bias of the recoil spring.

The idler wheel of the majority of such track type vehicles is rotatably carried by mounting brackets slidably mounted to the track roller frame. The idler wheel thus moves in a rectilinear path against the force of the recoil spring in a one-to-one relationship such that movement of the idler wheel results in an equal amount of compression of the spring. The tension in the track progressively increases during recoil due to the increasing bias of the recoil spring as it becomes progressively compressed. Thus the track roller frame, bearings, and related supporting structure must be designed to accommodate such excessive internal stresses generated therein. This results in a more massive and heavier components.

U.S. Pat. No. 3,899,218 which issued to Blomstrom, et al on Aug. 12, 1975 discloses a track mechanism in which the idler wheel is swingably mounted to an idler wheel support having one end pivotally connected to the frame and the other end conncected to the recoil mechanism through an elongate link. Technically, that mechanism provides a small degree of variability in the effective movement arm during recoil of the idler wheel against the recoil spring. However, the change in the effective movement arm is so small, no noticeable benefit is derived therefrom in relieving the excessive stresses in the track chain and related structure during recoil. Thus, that mechanism would not solve the problem of excessive forces generated in the mechanism during recoil.

The present invention is directed to overcoming one or more of the problems as set forth above.

DISCLOSURE OF THE INVENTION

In one aspect of the present invention, a recoil mechanism is provided for resiliently resisting recoil movement of an idler wheel of a friction drive track belt mechanism having a track belt entrained around the idler wheel and a drive wheel. An elongate recoil spring mechanism has first and second end portions with the first end portion being connected to a frame. An idler wheel mounting bracket has first and second end portions and an intermediate portion therebetween with the idler wheel being rotatably mounted to the intermediate portion and the first end portion being pivotally connected to the frame at a first pivot wherein the mounting bracket is pivotal about the first pivot between a first position at which the idler wheel is at a normal operating position and a second position at which the idler wheel is at a recoiled position. A link has first and second end portions with the first end portion being pivotally connected to the second end portion of the lever at a second pivot and the second end portion of the link is pivotally connected to the second end portion of the recoil spring mechanism at a third pivot. A means is provided for guiding the third pivot in a preselected path so that the third pivot moves basically rearwardly toward the drive wheel through the total range of movement and moves slightly upwardly away from the frame during the initial portion of the rearward movement.

In another aspect of the present invention, a variable leverage recoil mechanism is provided for resiliently resisting recoil movement of an idler wheel of an endless track mechanism having a track belt entrained around the idler wheel and a drive wheel. An elongate recoil spring mechanism has first and second end portions with the first end portion being connected to a frame. An idler wheel mounting bracket has first and second end portions and an intermediate portion therebetween. The idler wheel is rotably connected to the intermediate portion. A first pivot pivotally connects the first end portion of the bracket to the forward end of the frame so that the bracket is pivotal about the first pivot between a first position at which the idler wheel is at a normal operating position and a second position at which the idler wheel is at a recoiled position. A first link has first and second end portions. A second pivot pivotally connects the first end portion of the first link to the second end portion of the bracket. A second link has first and second end portions. A third pivot pivotally connects the first end portion of the second link to the frame rearwardly of the first pivot. A fourth pivot pivotally interconnects the second end portions of the first and second links and the second end portion of the recoil spring mechanism so that the second link causes the fourth pivot to follow an arcuate path about the third pivot when the bracket pivots between the first and second positions.

The present invention provides an improved variable leverage recoil mechanism for preventing the tension in the belt from increasing excessively during recoil. During recoil movement of the idler wheel towards the drive wheel, the variable leverage recoil mechanism provides an increasing mechanical advantage over the force of the recoil spring. The rate of the increase in mechanical advantage is such that it substantially matches the increasing force required to compress the recoil spring. Thus the stresses generated in the recoil mechanism are drastically reduced allowing the use of lighter weight components.

BRIEF DESCRIPTION OF THE DRAWINGS

FIG. 3 is similar to FIG. 2 but with the idler wheel in a recoiled position.

FIG. 4 is a top view of FIG. 3.

FIG. 5 is a fragmentary view similar to FIG. 2 schematically illustrating advantages of the invention.

BEST MODE FOR CARRYING OUT THE INVENTION

Figure 1:
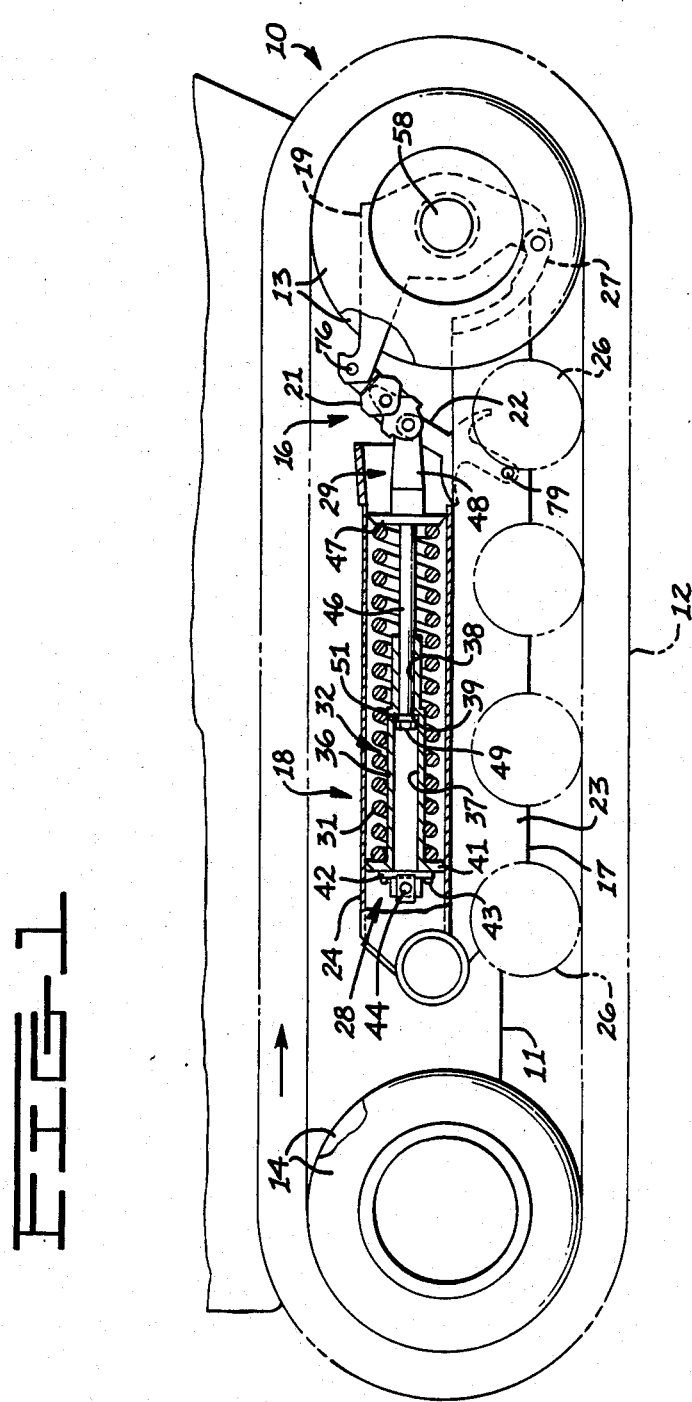
FIG. 1 is a side elevational view of an embodiment of the present invention with portions broken away for illustrative convenience.

Referring to the drawings, a friction drive track belt mechanism 10 is suitably connected to a vehicle main frame partially shown at 11 and includes an inextensible elastomeric endless track belt 12 entrained around a pair of axially space idler wheels 13 and a pair of drive wheels 14. The mechanism 10 includes a variable leverage recoil mechanism 16 for resiliently resisting recoil movement of the idler wheels 13 toward the drive wheels 14.

The recoil mechanism 16, in the embodiment illustrated, includes a roller frame 17, an elongate recoil spring mechanism 18, an idler wheel mounting bracket 19, and a pair of links 21 and 22.

The roller frame 17 is suitably connected to the main frame 11 in the usual manner and includes an elongate lower beam 23 and an upper cylindrical portion 24. A plurality of rollers 26 are rotatably connected to a lower surface of the lower beam 23. A forward end portion 27 of the lower beam 23 extends forwardly between the pair of idler wheels 13.

The recoil spring mechanism 18 is contained within the cylindrical portion 24 of the roller frame 17 and has first and second end portions 28,29 with the first end portion 28 being connected to the roller frame 17. The recoil spring mechanism 18 includes a recoil spring 31 and a spring support means 32 for supporting the recoil spring 31 and retaining the recoil spring in a precompressed condition.

The spring support means 32 includes a tubular member 36 extending into one end of the recoil spring 31. The tubular member 36 has first and second bores 37,38 therein with the first bore terminating at an annular shoulder 39. An annular flange 41 is integrally connected to an end of the tubular member 36. A mounting bracket 42 is secured to the flange 41 by a plurality of bolts 43 and is connected to the cylindrical portion 24 of the roller frame 17 with a pin 44. The support means 32 also includes a rod 46 extending into the other end of the recoil spring and slidably extends through the second bore 38 of the tubular member 36. An annular flange 47 is integrally secured to the rod 36. A bifurcated bracket 48 extends from the flange 47 forwardly toward the idler wheels 13. A bolt 49 passes through a spacer 51 positioned for abutment with the shoulder 39 and threadably engages a threaded bore in the rod 46. An annular dust seal 52 is suitably connected to the annular flange 47 and sealingly contacts the inner surface of the cylindrical portion 24 of the roller frame 17.

Figure 2:
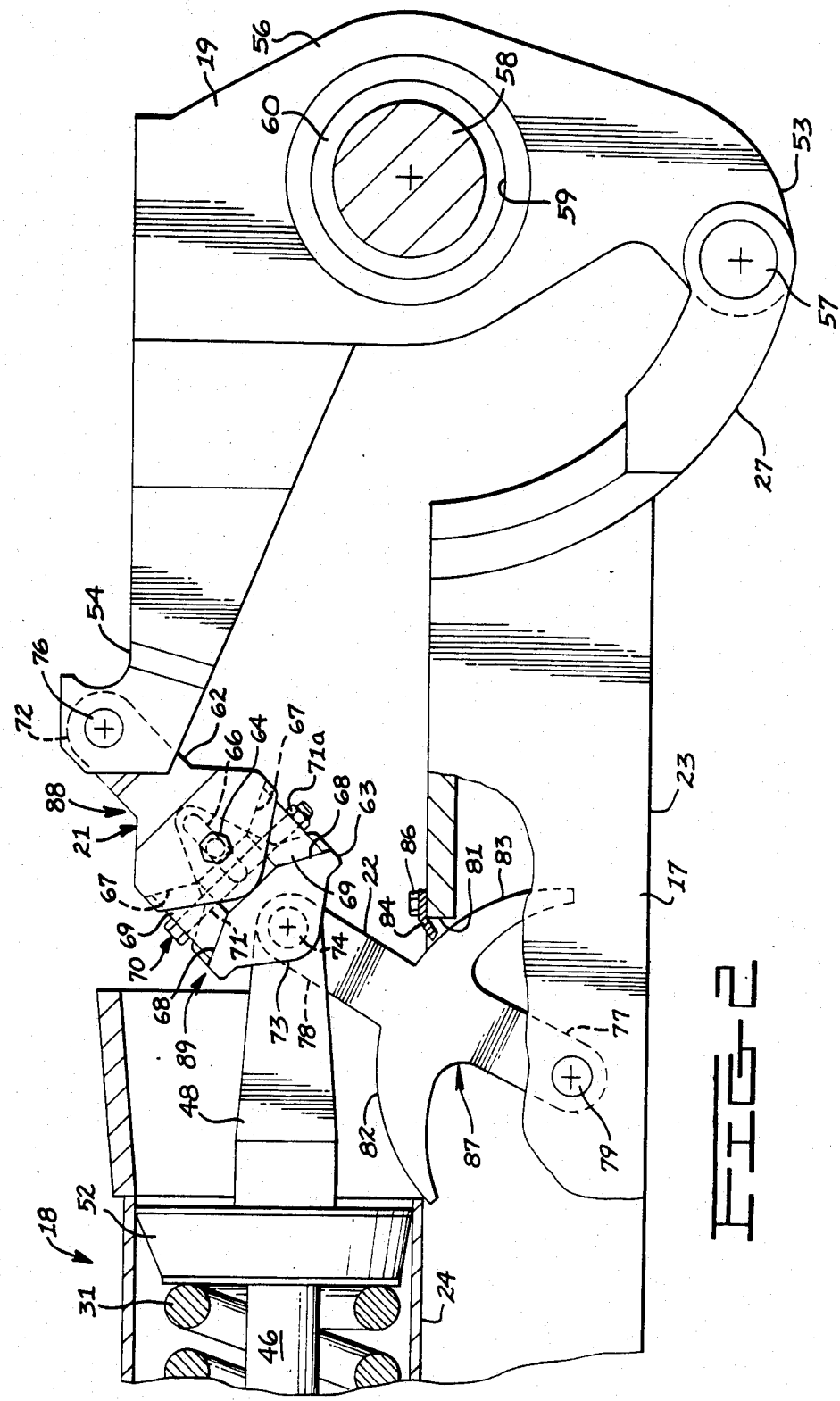
FIG. 2 is an enlarged view of the righthand portion of FIG. 1.

As more clearly shown on FIGS. 2 and 3, the mounting bracket 19 has first and second end portions 53,54 and an intermediate portion 56 therebetween. The first end portion 53 is pivotally connected to the forward end portion 27 of the roller frame 17 by a pivot 57. A live shaft 58 extends through a bore 59 defined in the intermediate portion 56 of the mounting bracket 19 and is suitably journalled thereto by a bearing 60. The pair of idler wheels 13 are connected to the end portions of the shaft 58. The second end portion 54 of the mounting bracket 19 includes a pair of laterally spaced forwardly facing slots 61. The idler wheels 13 are thus swingably carried by the mounting bracket 19 so that they are movable toward and away from the drive wheels 14.

As more clearly shown in FIGS. 3 and 4, this embodiment includes a pair of laterally spaced links 21 each of which can be selectively adjusted to change its effective length. Each of the links 21 is a multi-piece assembly including first and second members 62,63 having overlapping portions releasably fastened together by a bolt 54. The first member 62 has an elongated slot 66 therein through which the bolt 54 extends. A pair of tapered surfaces 67 are formed on the first member 62. A pair of oppositely directed tapered surfaces 68 are similarly formed on the other member 63 in facing relationship to the tapered surfaces 67. A pair of wedges 69 are seated in the resulting "V" shaped slots formed by the tapered surfaces 67,68. A threaded fastening means 70 is provided for controlling the relative positions of the wedges 69. The means 70 includes a bolt 71 and a nut 71a which retain the wedges in abutment with the tapered surfaces 67,68.

Both of the links 21 has first and second end portions 72,73. The first end portions 72 of the pair of links 21 extends into the slots 61 of the mounting bracket 19 and are pivotally connected thereto by a pair of pivots 74. The second end portions 73 of the links 21 straddle the bifurcated bracket 48 and are pivotally connected thereto by a pivot 76.

The link 22 has first and second end portions 77,78 with the first end portion being pivotally connected to the roller frame 17 by a pivot 79. The second end portion 78 extends between the spaced apart elements of the bifurcated bracket 48 and is pivotally connected to both the bracket and the second end portion 73 of the links 21 by the common pivot 74.

The link 22 extends through an elongated slot 81 in the roller frame 17 and includes a pair of arcuate surfaces 82,83 having a centerpoint coinciding with the axis of the pivot pin 76. The arcuate surface 82 is in close proximity to one end of the slot 81 and cooperates therewith to minimize the passage of foreign material through the slot 81. Similarly, a scraper 84 is secured to the frame 17 at the other end of the elongate slot 81 by a bolt 86 in close proximity to the arcuate surface 83. The link 22 serves as a means 87 for guiding the pivot 74 between the link 21 and the recoil spring mechanism 18 in a preselected path. The tapered surfaces 67 and 68 of the first and second members 62,63, the wedges 69 and the threaded fastening means 70 provide a means 88 for changing the effective length of the link 21.

INDUSTRIAL APPLICABILITY

FIGS. 1 and 2 show the idler wheels 13 and the variable leverage recoil mechanism 16 in their normal operating position. During forward travel of the vehicle, the upper run of the track belt 12 moves from left to right in the direction of the arrow. Conversely, the upper run of the track belt moves from right to left when the vehicle is driven in reverse. As will hereinafter be described in greater detail the recoil spring 31 is retained in a precompressed condition between the flanges 41,47 of the spring support means 32 and a preselected static tension is provided in the track belt 12. Static tension as hereinafter used is the tension in the track belt established by the relative position of the drive wheels 14 and idler wheels 13 when the vehicle is at rest.

If a solid object becomes lodged between the track belt 12 and the idler wheel 13 or drive wheel 14 when the vehicle is being driven in either direction, the tension in the track belt 12 increases causing a force to be applied to the idler wheels tending to pivot the mounting bracket 19 counterclockwise about the pivot 57. Counterclockwise pivoting of the mounting bracket 19 moves the pivot 76 and end portion 72 of the link 21 in an arcuate path generally toward the pivot 79. This causes the links 21,22 to buckle such that the pivot 74 moves in an arcuate guided path about the pivot 79 generally rearwardly toward the drive wheels 14 as shown in FIG. 3. The rearward movement of the pivot 74 moves the bracket 48 and flange 47 rearwardly thereby compressing the recoil spring 31. It will be noted that when comparing FIGS. 2, 3, and 5, the relationship of the mounting bracket 19 and the links 21,22 changes drastically when the idler wheel and hence mounting bracket 19 are moved from the normal operating position to the recoiled position.

More specifically as the mounting bracket 19 swings or pivots about the pivot 57 from the normal operating position of FIG. 2 to the recoiled position of FIG. 3, the shaft 58 and the pivot 76 swing in an arcuate path represented by the arcs A & B respectively. Both the arcs are divided into spaces representing equal increments of idler wheel movement. An arc C represents the path of movement of the pivot 74. While the movement of the pivot 74 is basically rearwardly toward the drive wheels 14, the pivot 74 moves slightly upwardly away from the frame 17 during the initial portion of the arc. The arc C is divided to indicate corresponding increments of movement of the pivot 74 in relation to the equal increments of travel indicated on arcs A & B. The progressively shorter increments into which arc C is divided graphically illustrate that the pivot 74 moves progressively lesser distances for each fixed increment of idler wheel movement. Such lesser distances can be correlated to a progressive change in the effective movement arm whereby the variable leverage recoil mechanism 16 exhibits a progressively increasing mechanical advantage over the force of the recoil spring 31 during recoil movement of the idler wheels. In this embodiment, the increase in the mechanical advantage over the recoil spring is sufficient to offset the increase in force required to compress the recoil spring 31 such that the tension in the track belt 12 remains substantially constant from the beginning of recoil to full recoil.

Once the object passes from between the track belt 12 and idler or drive wheels, the recoil spring 31 urges the bracket 48 forwardly causing the pin 74 to move forwardly in the arcuate path. This tends to move the links 21,22 toward their former near straight line relationship thereby pivoting the mounting bracket 19 clockwise moving the idler wheels 13 toward their normal operating position.

As noted above, the recoil spring 31 is normally retained in a precompressed state. The amount of force exerted by the spring in the precompressed state in this embodiment is determined basically by two factors. First of all, the track drive in this embodiment is a friction drive arrangement wherein the power to the track belt 12 is provided by frictional contact between the track belt and the drive wheels 14. To develop sufficient drive through the frictional contact, the position of the idler wheels 13 is adjusted in a manner hereinafter described to established a preselected static tension in the track belt. Such static tension applies a force to the idler wheels 13 urging the idler wheels rearwardly. As previously described, such force is transmitted through the mounting bracket 19 and links 21,22 so that the resultant force exerted against the recoil spring 31 is X units.

Secondly, it has been found that when a tracked vehicle of this configuration is driven in reverse, or the brakes are applied, the drive or braking force from the drive wheels 14 is applied to the top run of the track belt 12. The tension in the top run of the track belt 12 thereby increases to an amount equal to the reverse drawbar pull. This increased tension in the track belt applies an additional force to the idler wheels 13 urging them rearwardly. At maximum drawbar pull in reverse, the force exerted through the variable leverage mechanism 16 to the recoil spring 31 is "Y" units. This force is additive to the force "X" so that the precompression of the recoil spring 31 must be somewhat greater than "X"+"Y" to insure that the idler wheels are not moved toward the recoiled position due solely to inherent forces within the arrangement.

The static tension in the track belt 12 is established by the length of the links 21. In this embodiment, this is accomplished by positioning a hydraulic jack, schematically shown by broken lines at 90 on FIG. 5, of a preselected size at a preselected location between the second end portion 54 of the mounting bracket 19 and the roller frame 17. The bolts 64 holding the first and second members 62,63 of the links 21 are loosened and the hydraulic jack pressurized to a preselected pressure to pivot the mounting bracket 19 clockwise about the pin 57. The nuts 71 on the bolt 70 are then tightened to force the wedges 69 into contact with the tapered surfaces 67,68 and the bolts 64 retightened. It is assumed that the size of the hydraulic jack and the effective moment arm through which the force of the jack is applied to the mounting bracket 19 are known so that the preselected pressure needed to obtain the proper static tension is also known.

Other aspects, objects, and advantages of this invention can be obtained from a study of the drawings, the disclosure, and the appended claims.

I claim:

1. A recoil mechanism for resiliently resisting recoil movement of an idler wheel of a track belt mechanism having a track belt entrained around the idler wheel and a drive wheel comprising:
    a frame;
    an elongate recoil spring mechanism having first and second end portions, said first end portion being connected to the frame;
    an idler wheel mounting bracket having first and second end portions and an intermediate portion therebetween, said idler wheel being rotatably mounted to the intermediate portion, said first end portion being pivotally connected to the frame at a first pivot wherein said mounting bracket is pivotal about the first pivot between a first position at which the idler wheel is at a normal operating position and a second position at which the idler wheel is at a recoiled position;
    a link having first and second end portions, said first end portion being pivotally connected to the second end portion of the mounting bracket at a second pivot and said second end portion being pivotally connected to the second end portion of the recoil spring mechanism at a third pivot; and
    means for guiding the third pivot in a preselected path so that the third pivot moves basically rearwardly toward the drive wheel through the total range of movement and moves slightly upwardly away from the frame during the initial portion of its rearward movement.

2. The recoil mechanism of claim 1 wherein said link includes means for changing its effective length.

3. The recoil mechanism of claim 3 wherein said link includes first and second members releasably fastened together, said changing means including a pair of tapered surfaces on one of the first and second members and a pair of tapered wedges positioned between the first and second members in contact with the tapered surfaces, and threaded fastening means for controlling the relative position of the wedges.

4. The recoil mechanism of claim 1 wherein said guiding means includes another link having first and second end portions, said first end portion being pivotally connected to the frame at a fourth pivot and said second end portion being pivotally connected to the second end portion of the link and the recoil spring mechanism by the third pivot.

5. The recoil mechanism of claim 4 wherein the second and fourth pivots are located so that the pivot moves basically toward the pivot when the mounting bracket moves from the first position to the second position.

6. The recoil mechanism of claim 5 wherein the links define an included angle therebetween less than about 165° when the mounting bracket is at the first position.

7. A variable leverage recoil mechanism for resiliently resisting recoil movement of an idler wheel of a track belt mechanism having a track belt entrained around the idler wheel and a drive wheel comprising:
   an elongate frame;
   an elongate recoil spring mechanism having first and second end portions, said first end portion being connected to the frame;
   an idler wheel mounting bracket having first and second end portions and an intermediate portion therebetween, said idler wheel being rotatably connected to the intermediate portion;
   a first pivot pivotally connecting the first end portion of the bracket to the forward end of the frame, said bracket being pivotal about the first pivot between a first position at which the idler wheel is at a normal operating position and a second position at which the idler wheel is at a recoiled position;
   a first link having first and second end portions;
   a second pivot pivotally connecting the first end portion of the first link to the second end portion of the bracket;
   a second link having first and second end portions;
   a third pivot pivotally connecting the first end portion of the second link to the frame rearwardly of the first pivot; and
   a fourth pivot pivotally interconnecting the second end portions of the first and second links and the second end portion of the recoil spring mechanism, said second link causing said fourth pivot to follow an arcuate path about said third pivot when said bracket pivots between said first and second positions.

8. The recoil mechanism of claim 7 wherein pivotal movement of the bracket from the first position to the second position causes the second pivot to move in an arcuate path basically toward the third pivot.

9. The recoil mechanism of claim 8 wherein movement of the second pivot in equal increments results in progressively decreasing increments of movement of the fourth pivot when the bracket moves from the first position toward the second position.

10. The recoil mechanism of claim 7 wherein said first link includes means for changing its effective length.

11. The recoil mechanism of claim 10 wherein said first link includes first and second members releasably fastened together, said changing means including a pair of tapered surfaces on one of the first and second members, a pair of wedges positioned between the first and second members in contact with the tapered surfaces, and threaded fastening means for controlling the relative position of the wedges.

* * * * *